United States Patent
Panikkar et al.

(10) Patent No.: US 11,841,760 B2
(45) Date of Patent: Dec. 12, 2023

(54) OPERATING SYSTEM FOR COLLECTING AND TRANSFERRING USAGE DATA

(71) Applicant: Dell Products L.P., Round Rock, TX (US)

(72) Inventors: Shibi Panikkar, Bangalore (IN); Manav Ghosh, Bangalore (IN); Wallace Wei, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/728,580

(22) Filed: Apr. 25, 2022

(65) Prior Publication Data
US 2023/0289250 A1    Sep. 14, 2023

(30) Foreign Application Priority Data
Mar. 10, 2022   (IN) .............................. 202241013017

(51) Int. Cl.
*G06F 11/07*   (2006.01)
*G06F 11/32*   (2006.01)

(52) U.S. Cl.
CPC ...... *G06F 11/0778* (2013.01); *G06F 11/0784* (2013.01); *G06F 11/0787* (2013.01); *G06F 11/0793* (2013.01); *G06F 11/323* (2013.01)

(58) Field of Classification Search
CPC ............. G06F 11/0778; G06F 11/0784; G06F 11/0787; G06F 11/0793; G06F 11/323
See application file for complete search history.

(56) References Cited

U.S. PATENT DOCUMENTS

| | | | | |
|---|---|---|---|---|
| 7,228,371 B2* | 6/2007 | Schneider | ........... | G06F 11/3442 709/224 |
| 8,874,728 B2* | 10/2014 | Vichare | ................. | G06F 9/5011 709/224 |
| 2022/0156123 A1* | 5/2022 | Parker | ................. | G06F 11/3051 |

OTHER PUBLICATIONS

Utility Configuration Collector Metering: Overview & Requirements, Dell Technologies, available at: https://dl.dell.com/content/docu93453_ucc-2-0-metering-overview-and-requirements.pdf?language=en-us (last accessed Apr. 25, 2022), published Oct. 14, 2021.

* cited by examiner

*Primary Examiner* — Nadeem Iqbal
(74) *Attorney, Agent, or Firm* — Ryan, Mason & Lewis, LLP (57) ABSTRACT

Methods, apparatus, and processor-readable storage media for operating system for collecting and transferring usage data are provided herein. An example computer-implemented method includes: configuring two or more of a plurality of hardware components to perform respective data collection processes, wherein: the hardware components are associated with at least a first location, the configuring is performed by a system layer of an operating system installed on at least one of the plurality of hardware components, and a given one of the data collection processes collects usage data of the corresponding hardware component based on one or more characteristics of the corresponding hardware component; obtaining, by the operating system from the configured hardware components, the usage data collected by each of the data collection processes over a given time period; and uploading the obtained usage data to a datastore that is associated with at least a second location.

20 Claims, 6 Drawing Sheets

OPERATING SYSTEM FOR COLLECTING AND TRANSFERRING USAGE DATA

FIELD

The field relates generally to information processing systems, and more particularly to the processing of usage data related to such systems.

BACKGROUND

Pay-as-you-use pricing models are increasingly being used for computing products and services as they can help to avoid or reduce up-front infrastructure costs for organizations. For example, service providers often deploy managed storage and/or server infrastructure at a customer location, and the customer pays based on the use of such infrastructure. In these situations, software is typically installed on an application layer of a generic operating system associated with components of the storage and/or server infrastructure that collects and transfers usage data to the service provider. The software can be slow, inefficient, and/or difficult to secure and maintain because generic operating systems are not well suited to perform operations for collecting usage data.

SUMMARY

Illustrative embodiments of the disclosure provide an operating system for collecting and transferring usage data. An exemplary computer-implemented method includes configuring two or more of a plurality of hardware components to perform respective data collection processes, wherein: the hardware components are associated with at least a first location, the configuring is performed by a system layer of an operating system installed on at least one of the plurality of hardware components, and a given one of the data collection processes collects usage data of the corresponding hardware component based on one or more characteristics of the corresponding hardware component; obtaining, by the operating system from the configured hardware components, the usage data collected by each of the data collection processes over a given time period; and uploading the obtained usage data to a datastore that is associated with at least a second location.

Illustrative embodiments can provide significant advantages relative to conventional usage data collection techniques. For example, challenges associated with conventional usage data collection techniques are overcome in one or more embodiments by providing an operating system that executes built-in features related to the collection and transfer of usage data at the system level, which are more secure, robust, and faster relative to conventional approaches.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Existing techniques for collecting usage data and transferring the collected usage data to a remote location generally include a software tool that comprises a usage data collection and upload module. Other techniques include standalone software (often referred to as a software agent) that is deployed in a customer location (e.g., on server and/or storage devices) which collects, processes, and uploads the usage data to a remote location. In each case, the software is executed in the application layer of a general-purpose operating system, which can be slow and inefficient. Further, different usage data collection features are deployed separately in the application layer of the general-purpose operating system. However, the kernel mode and user mode of such operating systems are often overcrowded with modules for supporting a wide variety of services, which are often not required for software that collects and transfers usage data. Applications are deployed on top of these modules that communicate with the user mode, and the user mode communicates with the kernel mode based on multiple different layers using general-purpose drivers and libraries. This can negatively impact the performance of software features that relate to the collection and transfer of usage data. Further, these software features, and security-related needs corresponding to such features, are implemented and maintained by the developer, which makes it challenging to maintain and update the software.

At least some exemplary embodiments described herein provide an operating system configured specifically for features related to collecting and transferring usage data, including, for example: connecting different hardware components (e.g., nodes) and collecting usage and/or monitoring data; determining data to be collected (e.g., based on a customer consensus agreement); scheduling the collection of data; transforming data into a format to be sent to a datastore (e.g., a cloud of a service provider); providing visibility of the collected and processed data to a customer; customizing changes for specific customers; providing end-to-end data protection (from collector to core/cloud); and providing fault tolerant data collection.

Figure 1:
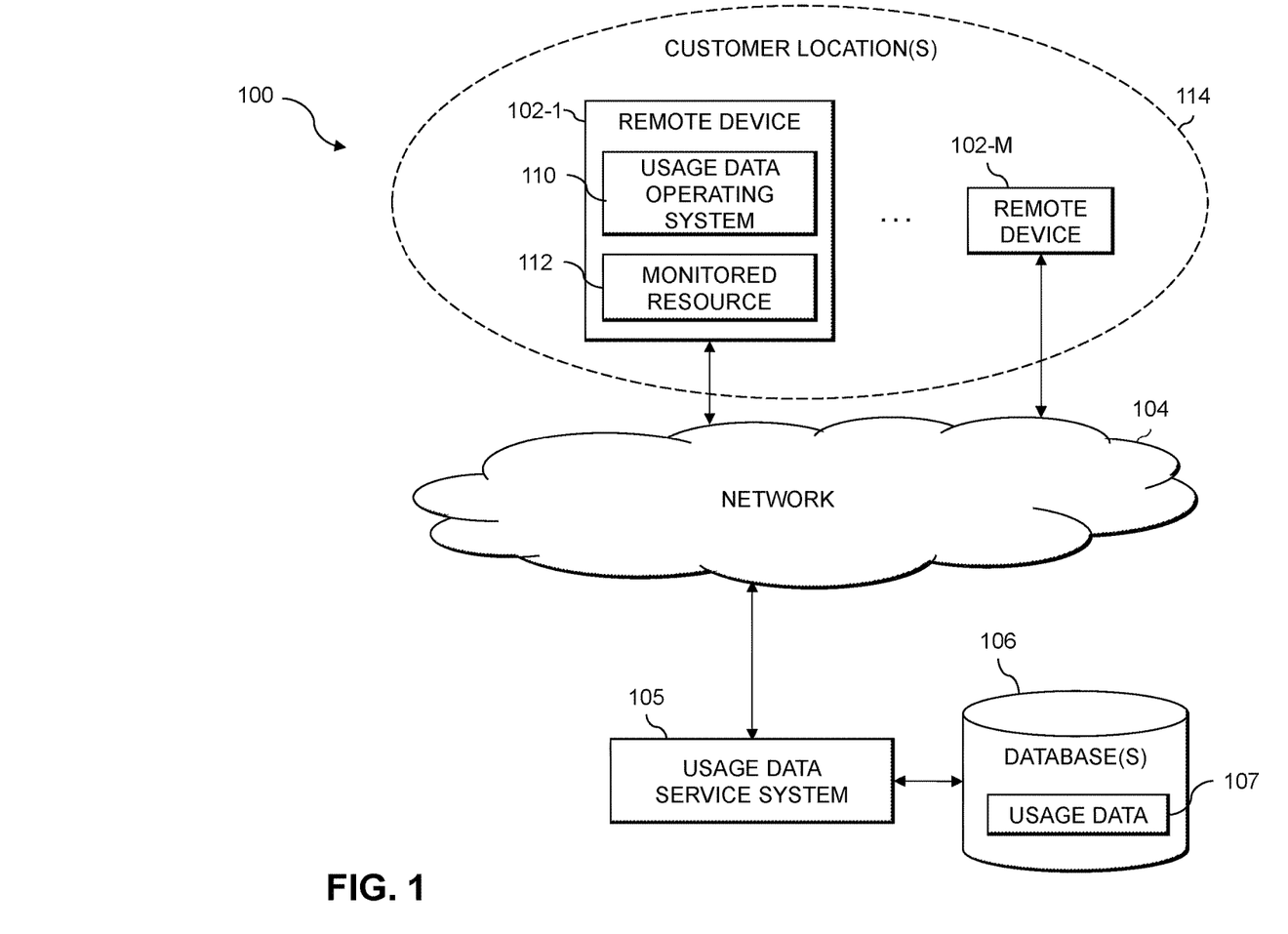
FIG. 1 shows an information processing system configured for collecting and transferring usage data in an illustrative embodiment.

FIG. 1 shows a computer network (also referred to herein as an information processing system) 100 configured in accordance with an illustrative embodiment. The computer network 100 comprises a plurality of remote devices 102-1, . . . 102-M, collectively referred to herein as remote devices 102. The remote devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a usage data service system 105.

The remote devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The remote devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the usage data service system 105 can have at least one associated database 106 configured to store usage data 107 pertaining to, for example, usage data associated with the remote devices 102. As a more particular example, the at least one associated database 106 may correspond to a data lake for usage data (also referred to as telemetry data). At least a portion of the one or more remote devices 102 can also have at least one associated database (not explicitly shown in FIG. 1).

An example database 106, such as depicted in the present embodiment, can be implemented using one or more storage systems associated with the usage data service system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

In the FIG. 1 embodiment, it is assumed that each of the remote devices 102 is located at one or more customer locations 114 that are remote from the usage data service system 105 as indicated by the dashed circle, for example. In other embodiments, it is possible for one or more of the remote devices 102, the usage data service system 105, and/or the at least one database 106 to be implemented at least in part in one or more same locations.

Also associated with the usage data service system 105 are one or more input-output devices, which illustratively comprise keyboards, displays or other types of input-output devices in any combination. Such input-output devices can be used, for example, to support one or more user interfaces to the usage data service system 105, as well as to support communication between the usage data service system 105, the remote device 102, and other related systems and devices not explicitly shown.

Additionally, the usage data service system 105 in the FIG. 1 embodiment is assumed to be implemented using at least one processing device. Each such processing device generally comprises at least one processor and an associated memory, and implements one or more functional modules for controlling certain features of the usage data service system 105.

More particularly, the usage data service system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the usage data service system 105 to communicate over the network 104 with the remote devices 102, and illustratively comprises one or more conventional transceivers.

In some embodiments, each of the remote devices 102 can be implemented in a similar manner as described above for the usage data service system 105. Additionally, it is assumed the remote device 102-1 includes a usage data operating system 110 and a monitored resource 112. In some examples, the usage data operating system 110 is installed on the remote device 102-1, which is used to collect usage data corresponding to one or other monitored resources (not explicitly shown) on the other remote devices 102. By way of example, the remote device 102-1 may comprise a manager node of a cluster of computing nodes and the other remote devices 102 may correspond to other nodes of the cluster. It is to be appreciated that, in some embodiments, the usage data operating system 110 may be implemented on multiple remote devices 102.

Figure 2:
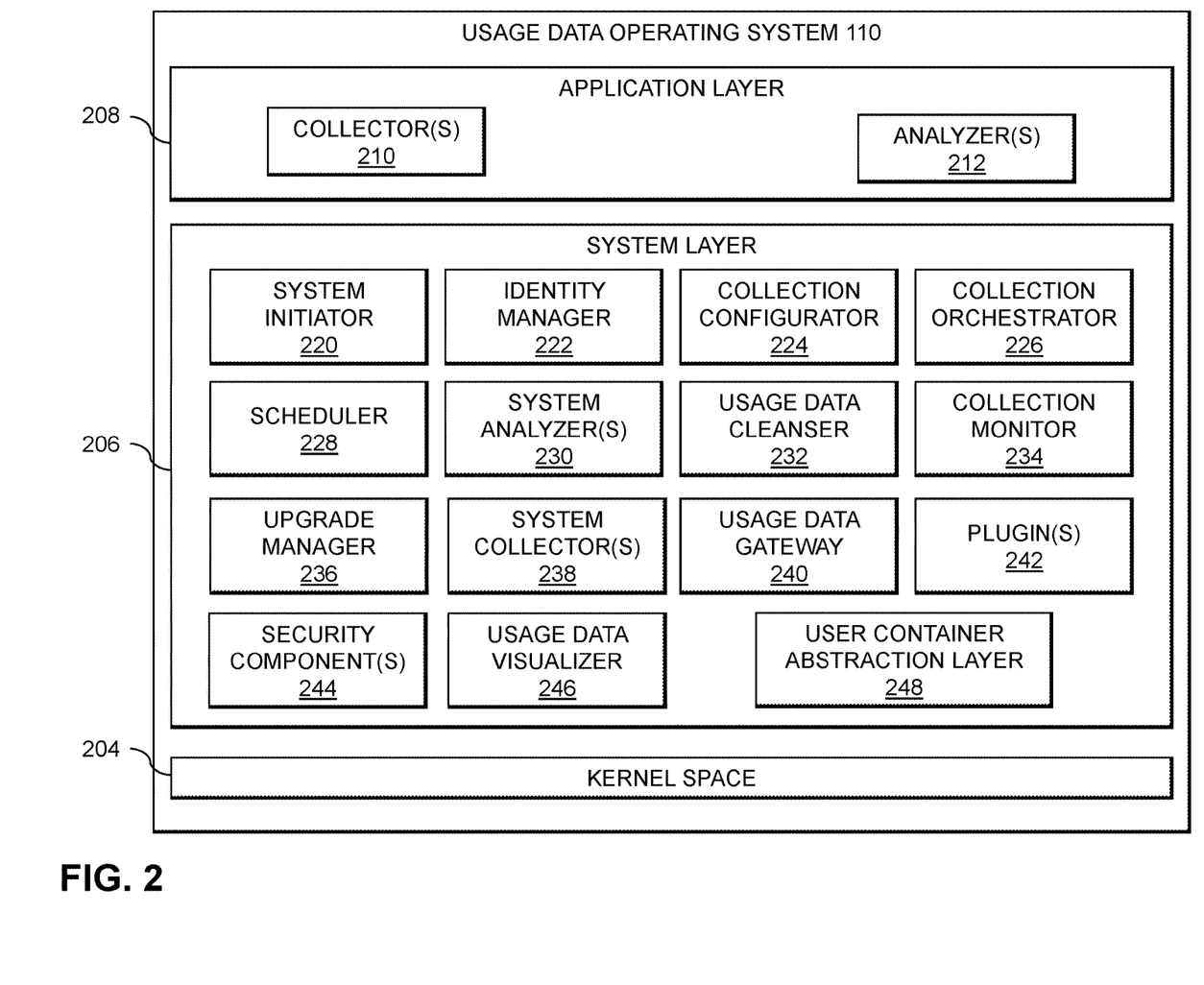
FIG. 2 is a block diagram showing components of an operating system for collecting and transferring usage data in an illustrative embodiment.

Components of the usage data operating system 110 are described in more detail in conjunction with FIG. 2, for example. The monitored resource 112 can correspond to a hardware component associated with the remote device (e.g., a storage and/or server component) for which usage data is collected.

The usage data service system 105 includes functionality for obtaining, processing, and storing usage data 107 that is collected from the remote devices 102. The usage data service system 105 can also provide billing and/or support services based at least in part on the usage data 107.

It is to be appreciated that this particular arrangement of elements 110 and 112 illustrated in the remote device 102-1 of the FIG. 1 embodiment is presented by way of example only, and alternative arrangements can be used in other embodiments. For example, the functionality associated with the elements 110 and 112 in other embodiments can be combined into a single element, or separated across a larger number of elements. As another example, multiple distinct processors can be used to implement different ones of the elements 110 and 112 or portions thereof.

At least portions of elements 110 and 112 may be implemented at least in part in the form of software that is stored in memory and executed by a processor.

It is to be understood that the particular set of elements shown in FIG. 1 for usage data service system 105 involving remote devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the usage data service system 105 and database(s) 106 can be on and/or part of the same processing platform.

An exemplary process utilizing elements 110 and 112 of an example remote device 102-1 in computer network 100 will be described in more detail with reference to, for example, the flow diagrams of FIGS. 3 and 4.

FIG. 2 is a block diagram showing components of an operating system for usage data in an illustrative embodiment. More specifically, FIG. 2 depicts an example of usage data operating system 110, which includes a kernel space 204, a system layer 206, and an application layer 208.

The kernel space 204, in some examples, manages network and other hardware interactions with devices and drivers. In one or more examples, the kernel space 204 may include at least some layers that are similar to a Linux operating system. For example, the kernel space 204 may include a device manager (e.g., udev), a network layer, a filesystem, and a hardware abstraction layer (HAL). It is to be appreciated that the device manager may manage device nodes and user space events raised when hardware devices are added or removed from the system, including firmware loading as required by certain devices. The HAL can be implemented to communicate with the network layer for communication related to usage data, for example. Also, in some embodiments, the kernel space 204 is used by other layers (e.g., the system layer 206 and the application layer 208) to communicate with a kernel (not explicitly shown in FIG. 2) of the kernel space 204. The kernel can be a modified version of an existing kernel (e.g., a Linux Kernel). For example, modules that are not used for the collection of usage data can be removed so that the kernel is optimized for devices and drivers related to the collection, processing and/or transfer of usage data.

The system layer 206 can include multiple system layer components or modules. In the FIG. 2 embodiment, the system layer 206 includes: system initiator 220; identity manager 222; collection configurator 224; collection orchestrator 226; scheduler 228; one or more system analyzers 230; usage data cleanser 232; collection monitor 234; upgrade manager 236; one or more system collectors 238; usage data gateway 240; one or more plugins 242; security components 244; usage data visualizer 246; and user container abstraction layer 248, each of which is described in more detail below. In at least some embodiment, the system layer 206 corresponds to a container infrastructure platform that begins to run at least a portion of the elements 220-248 as containers on top of the kernel when the usage data operating system 110 is booting up.

The system initiator 220 can include a bootstrap system which obtains a limited set of parameters to configure a network. For example, the set of parameters can correspond to one or more of: a Dynamic Host Configuration Protocol (DHCP), a Domain Name System (DNS); and a Default Gateway Weight Settings Protocol (DGW).

The system initiator 220 can initialize storage pertaining to the system (e.g., corresponding to remote device 102-1). This can include at least one of: creating folders for different datastores, expanding and resizing a disk; and, optionally, encrypting the disk. The system initiator 220, in some embodiments, can correspond to an ISO installation file (e.g., in a bare metal system) or a virtual appliance (e.g., in case of a hypervisor system). The system initiator 220 can initialize system and application containers on bootup, and manage system level services (e.g., Network Time Protocol (NTP) and DNS). Such services can be managed using container commands (e.g., start/stop/suspend).

The identity manager 222 enables a user to perform at least some of the following actions: define a service account that collects the data from different nodes (e.g., corresponding to one or more of the remote devices 102); maintain permissions in an access control list for a user account; assign user roles (e.g., to view analysis from the system analyzers 230 or visualization from the usage data visualizer 246); and perform Lightweight Directory Access Protocol (LDAP). Also, the identity manager 222 can be used by one or more of the security components 244 for user level data and transport security.

The collection configurator 224 allows a user to configure nodes or devices for which usage data is to be collected. For example, the collection configurator 224 can define the structure of input data and output data for different nodes, and configure one or more workflows to orchestrate the collection of the usage data.

Generally, the collection orchestrator 226 orchestrates usage data collected from each of the nodes or devices. For example, a collection orchestrator 226 can be initiated based on, for example, the collection configurator 224 and data collected from input-output (TO) to the configured nodes and the configured workflows. The metadata and usage data (e.g., collected by system collectors 238) corresponding to the collection orchestrator 226 can be saved in a data store (e.g., associated with remote device 102-1) for further processing.

The scheduler 228 enables users to schedule collection jobs. For instance, a user can define a frequency of data collection (e.g., hourly, daily, or weekly). For a given time period corresponding to the frequency, the scheduler 228 can determine appropriate times to collect the usage data from each node or device. This determination can be based on one or more machine learning models that can be trained to predict optimal times based on traffic collected from each node in one or more previous time intervals, for example. In some embodiments, the one or more machine learning models can be based on time-series algorithms, such as an autoregressive integrated moving average (ARIMA) algorithm, for example.

The system analyzers 230 can provide features to help analyze and visualize packet transactions related to the usage data operating system 110. For example, system logs or customer logs can be stored in a data store, and a given one of the system analyzers 230 can use such logs to visualize the state of transactions, errors, or exceptions. In some embodiments, the one or more system analyzers 230 can be separately installed, uninstalled, upgraded, and configured for components from which usage data is to be collected. For example, the relevant system analyzers 230 can be dynamically discovered and installed. Thus, configurations and help entries of the system analyzers 230 can be built into the system layer 206. As an example, a help entry can include help documents and/or information (e.g., in a markdown format), which may be rendered to a user (e.g., via a graphical user interface). Additionally, the help documents and/or information may be dynamically updated using information from an online resource.

As an example, the configuration items specification and help entries can be specified in a unified format and can be embedded in the component images (e.g., system analyzers 230 and system collectors 238).

In some embodiments a single instance of one of the system analyzers 230 can support one or more product types.

The usage data cleanser 232, optionally, can obfuscate sensitive data from the collected usage data based on a defined configuration (e.g., user-defined configuration). For example, a user can inspect collected data, and implement one or more obfuscation patterns to mask the sensitive data based on at least one of: XPath (e.g., if the target data is in an XML format); JsonPath (e.g., if the target data is in a j son or a yaml format); Regex (e.g., if the target data is in a free text format); and Glob file matcher (e.g., if a particular file should be skipped entirely). In some examples, the obfuscation can mask the data and replace it with a digest hash with a user-provided salt value. In such examples, the data is sent in the form of a digest hash without sending the original data to a core/cloud of the service provider (e.g., corresponding to usage data service system 105). The mapping between digest hash and original data is saved locally for a customer to lookup, and thus is not accessible to the service provider.

The collection monitor 234 monitors system health pertaining to the collection of usage data (e.g., transactions, logs, retries, failures and/or upload statistics). For example, the collection monitor 234, in some embodiments, can generate visualizations of such data in a dashboard view, detect failures, and generate alerts to send via one or more channels (e.g., via an email if a customer configures their SMTP (Simple Mail Transfer Protocol), or via a suitable messaging protocol (e.g., MQTT (Message Queueing Telemetry Transport)) to core/cloud via the usage data gateway 240).

The upgrade manager 236, in some embodiments, provides immutable root filesystems for system binaries with atomic upgrade and/or rollback support. The upgrade manager 236 can also provide rollback support for configuration data and databases pertaining to usage data. The upgrade manager 236 also manages the types of upgrades, such as, upgrades to the system, plugins, collectors, or analyzers. An upgrade or rollback, in some embodiments, can be initiated by a manager node and automatically propagate to worker nodes in a rolling fashion.

Generally, the one or more system collectors 238 correspond to collectors that are defined at the operating system level for a predefined product type. For each product type, each collector can be installed, uninstalled, upgraded, and configured independently. In some embodiments, a given collector can depend on one or more of the plugins 242, as described in more detail elsewhere herein.

The usage data gateway 240 manages incoming and outgoing packets in the usage data operating system 110. Generally, the usage data gateway 240 is responsible for remote management and monitoring functions (e.g., heartbeat, alert, remote management session, and/or remote upgrade functions); and uploading usage and/or call home data. In some embodiments, the usage data gateway 240 can support one or more transportation protocols (e.g., REST (REpresentational State Transfer), MQTT, SFTP (Secure File Transfer Protocol), Samba/CIFS (Common Internet File System)), and can provide reliable transmission with fault tolerance. For example, the usage data gateway 240 can support the following functions: bulk upload, retry, queuing, acknowledgement, and throttling.

The one or more plugins 242 can provide custom implementations for one or more collectors 210 for a specific implementation. The system can dynamically discover installed plugins and add their respective configurations and help entries to the collection configurator 224, for example.

The security components 244 provide built-in operating system level security for all communications, without needing the security to be separately managed by developers. For example, the security components 244 can include at least one of:

Intrinsic security for endpoints, workloads, and containers: Communication to the workloads in the containers are secured in the infrastructure-level using special ingress control. This also enables a malicious attack to be identified in conjunction with the identity manager 222.

Intrinsic security on network: inter-container and gateway packet communications are performed using, for example, a latest and strongest TLS/SSL (Transport Layer Security/Secure Sockets Layer) protocol and cryptographic algorithms.

Data can be encrypted at rest and in motion at the operating system level.

The usage data visualizer 246 renders visualizations corresponding to one or more reports of usage data and the system monitor dashboards. In some embodiments, default dashboards are used to monitor statistics. Also, when a new analyzer is installed, the usage data visualizer 246 can combine the corresponding dashboards, such that after the analyzer is installed, the dashboards can be installed and be ready to visualize the analyzed data output in a datastore corresponding to the remote device 102-1, for example. Optionally, a user can define customized dashboards from data available in the datastore. One or more dashboards can be exported as a file (e.g., PDF file or CSV file).

The user container abstraction layer 248 includes one or more application programming interfaces (APIs) that enable customized applications and/or analyzers in the application layer 208 to connect with the system layer 206. Accordingly, packet transmissions corresponding to customized applications and/or analyzers can all be directed to the system layer 206. The intrinsic security features, including the one or more security components 244, of the usage data operating system 110 are applied at the operating system level (e.g., to workloads, containers, and/or endpoints). More specifically, the application layer 208 enables users to implement one or more collectors 210 and one or more analyzers 212 using customized configurations.

For example, the one or more collectors 210 can be implemented when the system collectors 238 fail to include a collector for a given product type. In such an example, a user can define customer collectors 210 based on a standardized format for usage data, thus enabling the user to implement the one or more collectors 210 using different programming languages packaged in a container image together with metadata. The metadata may include one or more of: product types supported by the custom collector, definitions of parameters to carry out the collection; help documents (e.g., in a markdown format, which are rendered and dynamically plugged into an online help page); and scheduling frequency requirements (e.g., minimum, maximum, and default). The definition of the parameters may include connection and credential parameters, for example.

Similarly, one or more analyzers 212 can be defined if the system analyzers 230 do not support a particular product type. For example, the one or more analyzers 212 can be defined based on a standardized format to enable the user to implement analyzers that correspond to the one or more collectors 210 using different programming languages. A given one of the analyzers 212 can be packaged into a container image with at least a portion of the following metadata: collectors the analyzer supports; definitions of a set of parameters; help documents; data definition language (DDL) for the analyzed data; and a dashboards definition.

In one embodiment, the usage data operating system 110 can be downloaded from the usage data service system 105, for example. The usage data operating system 110 checks whether it has been configured when it boots up. If not, the usage data operating system 110 boots ups, then a configuration process is initiated (e.g., by system initiator 220), which is used to configure the usage data operating system 110 for data collection. It is noted that the usage data operating system 110 can also be re-configured after the initial configuration. For example, on successful authentication of an administrator, the usage data operating system 110 can be reconfigured to connect to new nodes or edit one or more existing nodes. There is no need to reboot the operating system as this can be implemented as a container.

Figure 3:
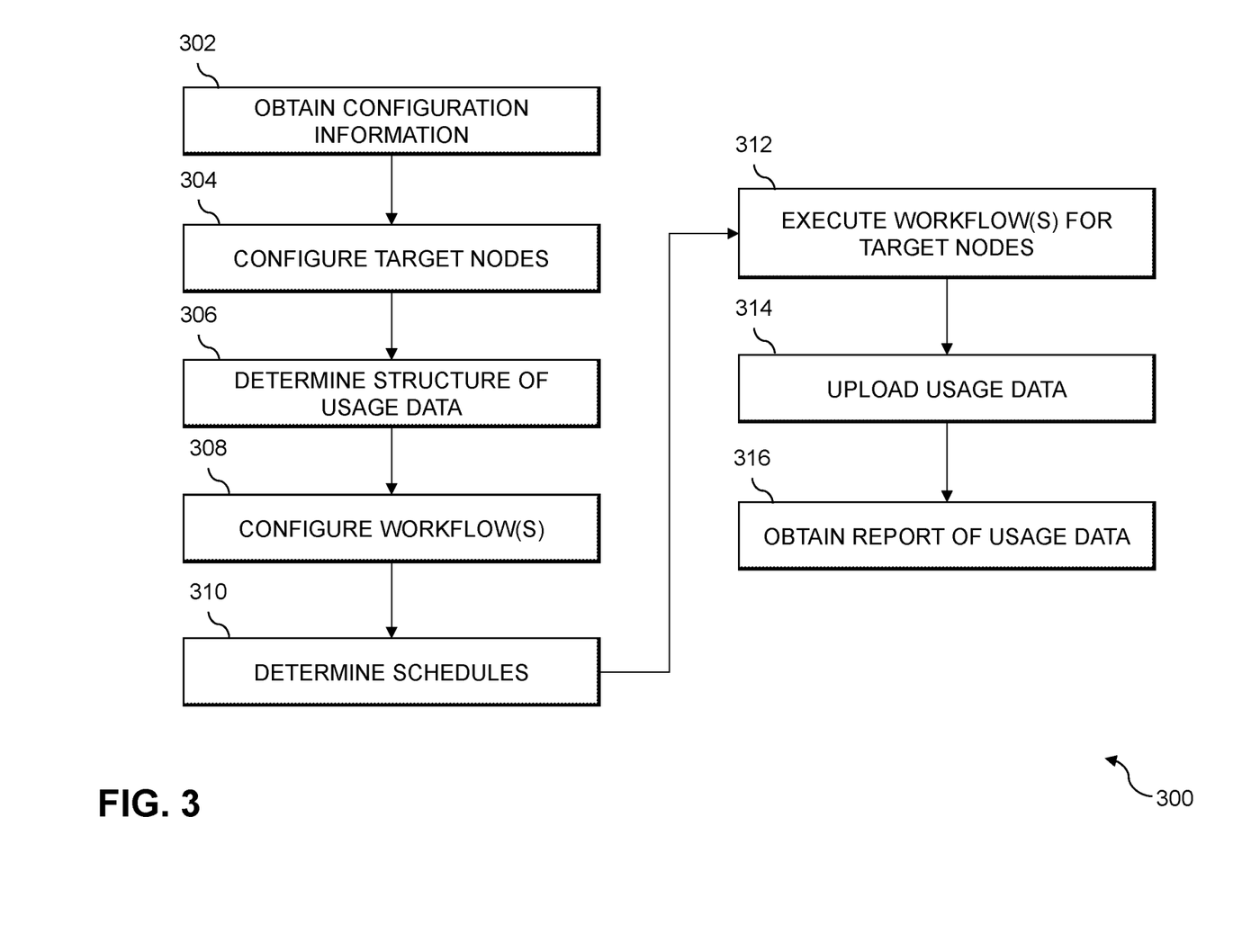
FIG. 3 shows a flow diagram of a configuration process in an illustrative embodiment.

FIG. 3 shows a flow diagram of a configuration process 300 in an illustrative embodiment. It is to be understood that this particular process is only an example, and additional or alternative processes can be carried out in other embodiments. In this embodiment, the process includes steps 302 through 316. These steps are assumed to be performed by the remote device 102-1 utilizing usage data operating system 110.

Step 302 includes obtaining configuration information for collecting usage data from a set of target nodes. Step 304 includes configuring the set of target nodes based on the configuration information. For example, the configuration information can identify a plurality of resources to be monitored (e.g., including monitored resource 112 and/or resources corresponding to at least a portion of the other remote devices 102), which is used to determine the set of target nodes. Step 306 includes determining a structure of usage data that is to be used. For example, step 306 can include determining a format in which usage data is collected from a target node, and a format in which usage data is uploaded (e.g., to usage data service system 105). Step 308 includes configuring one or more workflows to collect, process, analyze, and report the usage data from the set of target nodes to the usage data operating system 110. Step 310 includes determining schedules to perform each of the workflows (e.g., using scheduler 228). Step 312 includes executing the workflows on each of the target nodes according to the respective schedules. Step 314 includes uploading the collected usage data to usage data service system 105. Step 316 includes obtaining a report of the usage data (e.g., from the usage data service system 105).

As an example, each workflow may include: a collection function that collects raw usage data from configured devices, a processing function that parses and normalizes the raw usage data into a standard format; an analysis function that performs data analytics on the normalized data; and a reporting function that generates user-readable reports based on the analytics. In some embodiments, each workflow is considered a generic workflow of the usage data operating system 110, and the settings of the workflow can be adjusted based on logical groups of configured devices. More specifically, a process of a workflow may be substantially the same across different asset types, and then the settings corresponding to the workflow can be specified for a particular type of component for which usage data is to be collected. By way of example, the settings for a collection function of a workflow may be based on the collector that is defined for a given type of component. As further examples, the settings for a processing function of a workflow can depend on the data collected for the type of component (e.g., CPU data, memory data, and/or network data), and the settings for an analyzing step can be based on the analyzer defined for the data of the asset type (e.g., network throughput or storage deduplication ratio).

Accordingly, usage data collected from the set of target nodes can be processed and transformed by the usage data operating system 110 into a consistent format associated with the usage data service system 105. By way of example, the transformation can be based on a defined template, and usage data collected from the set of target nodes can be transformed using data cleaning and normalization methods. As an example, usage data for memory resources that is collected as bytes can be normalized into a defined standard format, such as megabytes (MBs).

The usage data operating system 110, in some embodiments, includes an efficient architecture that can be installed, bootstrapped and configured (e.g., with a minimal amount of configuration), and offers different levels of automation and control for usage data collection processes. A number of serviceability features can also be supported. For example, remote upgrades can be implemented to upgrade both the usage data operating system 110 as well as collectors, analyzers, and plugins. Other serviceability features can include remote management, self-monitoring, and self-healing.

The usage data operating system 110, in at least one embodiment, also includes features that improve scalability. For example, such features can allow clusters to be easily set up using node roles (e.g., control plane, worker, and upload agent). As another example, usage data collection workloads can also be automatically partitioned and scheduled based on performance and/or network topology.

The usage data operating system 110 may implement a number of security features. In some embodiments, the security features are built into the usage data operating system 110 to provide intrinsic security, such as end-to-end encryption for storage and transportation of usage data, code signing and digital signature verification, compliance with one or more standards (e.g., FIPS-140), and a customer consensus module. In one example, a user can review all collected usage data and then approve portions of the usage data that are to be transmitted to the usage data service system 105, for example.

Additional capabilities can be added to the usage data operating system 110 using plugins and configurable workflows. For example, the usage data operating system 110 can be implemented on different container-based platforms with domain-specific custom resource definitions (CRDs). The usage data operating system 110 can also support both bare metal and multiple types of hypervisor environments.

Figure 4:
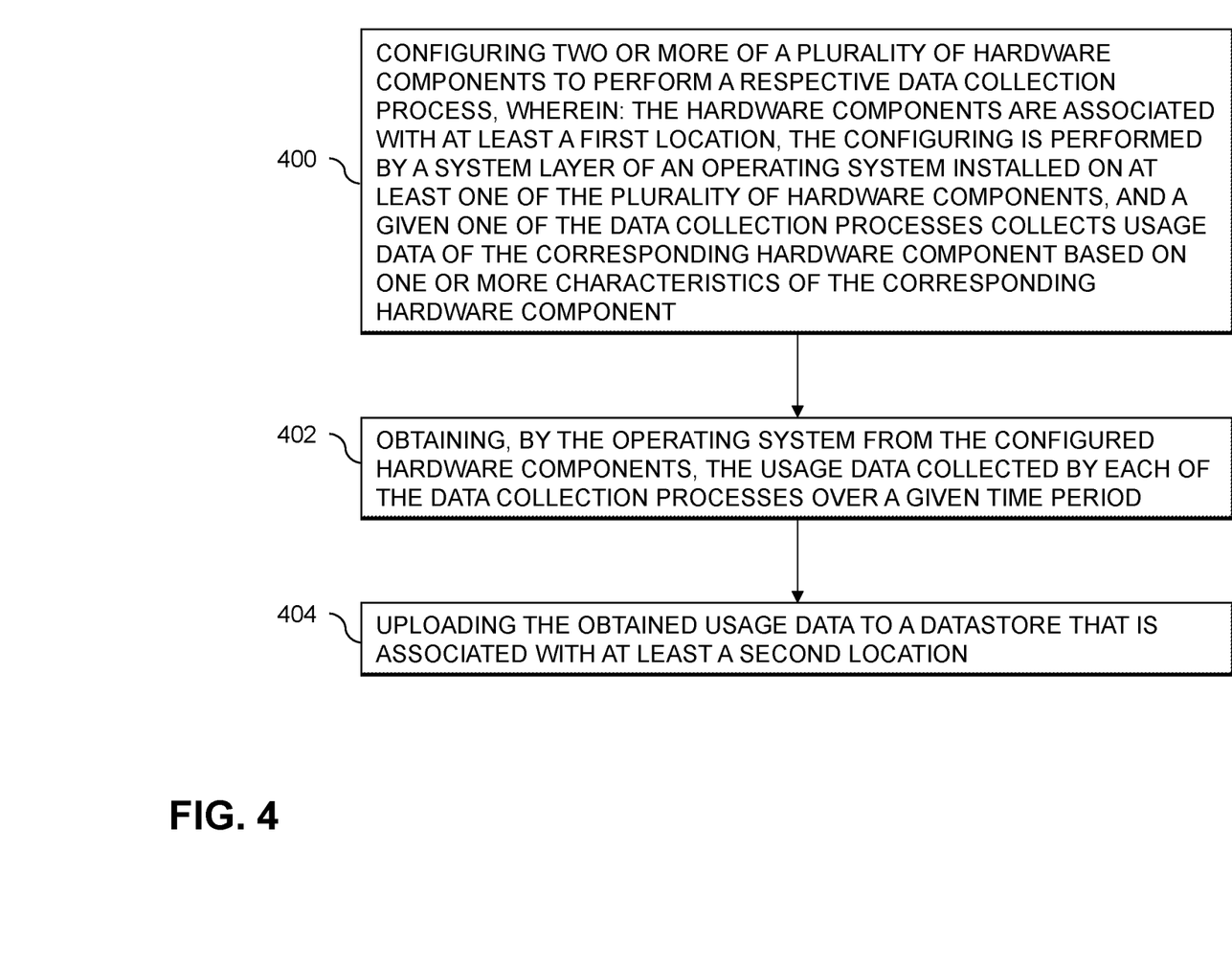
FIG. 4 shows a flow diagram of a usage data collection and transfer process performed by an operating system in an illustrative embodiment.

FIG. 4 shows a flow diagram of a usage data collection process performed by an operating system in an illustrative embodiment. It is to be understood that this particular process is only an example, and additional or alternative processes can be carried out in other embodiments.

In this embodiment, the process includes steps 400 through 404. These steps are assumed to be performed by the remote device 102-1 utilizing its usage data operating system 110.

Step 400 includes configuring two or more of a plurality of hardware components to perform respective data collection processes, wherein: the hardware components are associated with at least a first location, the configuring is performed by a system layer of an operating system installed on at least one of the plurality of hardware components, and a given one of the data collection processes collects usage data of the corresponding hardware component based on one or more characteristics of the corresponding hardware component. Step 402 includes obtaining, by the operating system from the configured hardware components, the usage data collected by each of the data collection processes over a given time period. Step 404 includes uploading the obtained usage data to a datastore that is associated with at least a second location.

The given data collection process may be defined at the system layer of the operating system based on a type of the corresponding hardware component. The given collection process may: (i) be defined by a plugin installed at an application layer of the operating system and (ii) communicate with the system layer of the operating system via one or more application programming interfaces. The operating system may monitor information corresponding to a given one of the configured hardware components, and the information may include one or more of: transactions, errors, and exceptions associated with the data collection process of the given hardware component. The process may include a step of providing, by the operating system, a dashboard that visualizes at least a portion of the monitored information. The process may include steps of detecting one or more failures associated with the data collection process of the given hardware component based on an analysis of the monitored information; and performing at least one automated action in response to the detecting. The process may include a step of determining a time within the given time period to collect the usage data corresponding to a given one of the configured hardware components based at least in part on a pattern corresponding to at least one performance metric learned by the operating system for the given hardware component over one or more previous time periods. The one or more characteristics of the corresponding hardware component may include at least one of: an input data structure associated with the corresponding hardware component; an output data structure associated with the corresponding hardware component; and a data collection frequency associated with the corresponding hardware component. The plurality of hardware components may relate to at least one of: a storage infrastructure and a server infrastructure managed by a service provider, and wherein the usage data is uploaded to a cloud of the service provider that comprises the datastore. The process may include a step of obfuscating, by the system layer of the operating system, at least a portion of the usage data collected by a given one of the data collection processes.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide an operating system that significantly improves development, deployment, and operations pertaining to the collection and transfer of usage data to a remote location. These and other embodiments can effectively overcome problems associated with existing remote data collection techniques that require software to be installed on an application layer of a general-purpose operation system. For example, the operating system, in some embodiments described herein, can be configured to execute built-in features related to the collection and transfer of usage data at the system level on boot-up. These and other embodiments can effectively provide more secure, robust, and faster usage data features relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
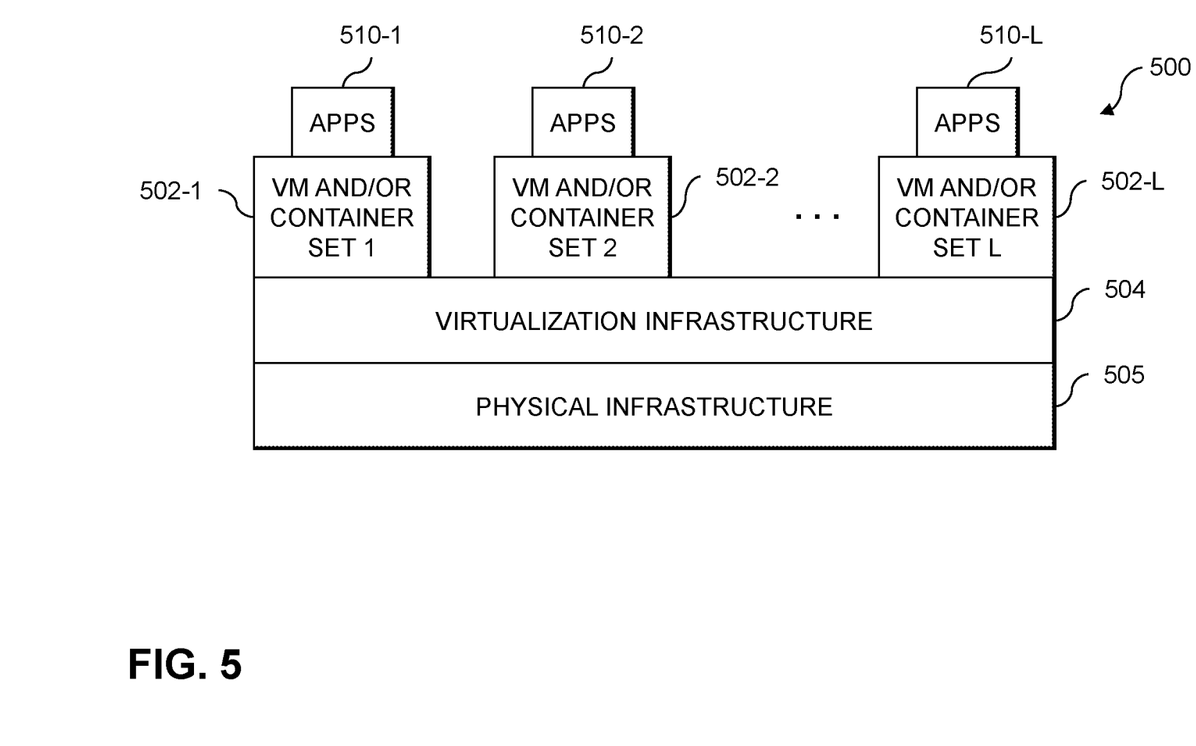
FIGS. 5 and 6 show examples of processing platforms that may be utilized to implement at least a portion of an information processing system in illustrative embodiments.
Figure 6:
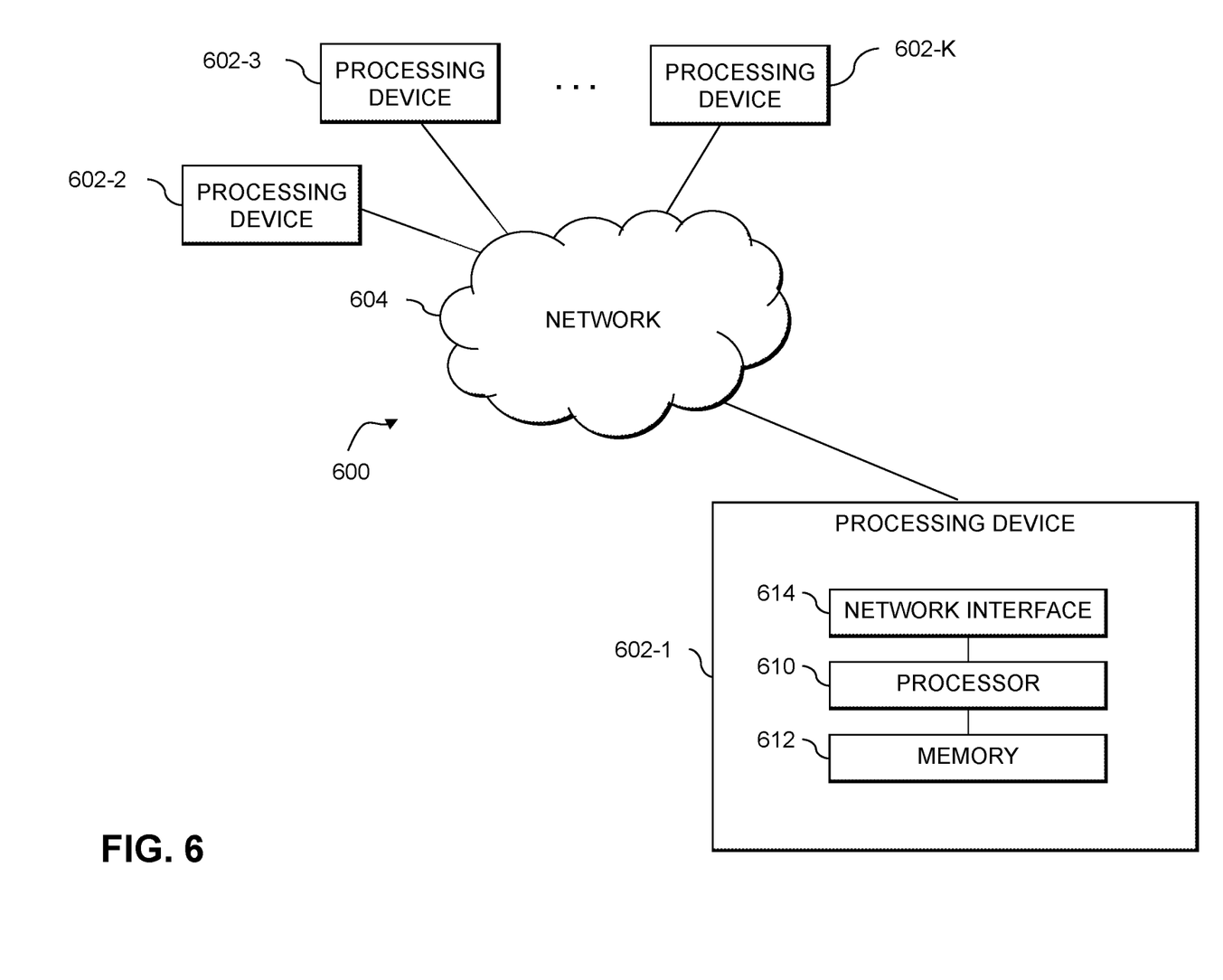

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines.

Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
configuring two or more of a plurality of hardware components to perform respective data collection processes, wherein: the hardware components are associated with at least a first location, the configuring is performed by a system layer of an operating system installed on at least one of the plurality of hardware components, and a given one of the data collection processes collects usage data of the corresponding hardware component based on one or more characteristics of the corresponding hardware component;
obtaining, by the operating system from the configured hardware components, the usage data collected by each of the data collection processes over a given time period; and
uploading the obtained usage data to a datastore that is associated with at least a second location;
wherein the method is performed by at least one processing device comprising a processor coupled to a memory.

2. The computer-implemented method of claim 1, wherein the given data collection process is defined at the system layer of the operating system based on a type of the corresponding hardware component.

3. The computer-implemented method of claim 1, wherein the given data collection process is: (i) defined by a plugin installed at an application layer of the operating system and (ii) communicates with the system layer of the operating system via one or more application programming interfaces.

4. The computer-implemented method of claim 1, wherein the operating system monitors information corresponding to a given one of the configured hardware components, wherein the information comprises one or more of: transactions, errors, and exceptions associated with the data collection process of the given hardware component.

5. The computer-implemented method of claim 4, comprising:
providing, by the operating system, a dashboard that visualizes at least a portion of the monitored information.

6. The computer-implemented method of claim 4, comprising:
detecting one or more failures associated with the data collection process of the given hardware component based on an analysis of the monitored information; and
performing at least one automated action in response to the detecting.

7. The computer-implemented method of claim 1, comprising:
determining a time within the given time period to collect the usage data corresponding to a given one of the configured hardware components based at least in part on a pattern corresponding to at least one performance metric learned by the operating system for the given hardware component over one or more previous time periods.

8. The computer-implemented method of claim 1, wherein the one or more characteristics of the corresponding hardware component comprise at least one of:
an input data structure associated with the corresponding hardware component;
an output data structure associated with the corresponding hardware component; and
a data collection frequency associated with the corresponding hardware component.

9. The computer-implemented method of claim 1, comprising:
obfuscating, by the system layer of the operating system, at least a portion of the usage data collected by a given one of the data collection processes.

10. The computer-implemented method of claim 1, wherein the plurality of hardware components relates to at least one of: a storage infrastructure and a server infrastructure managed by a service provider, and wherein the usage data is uploaded to a cloud of the service provider that comprises the datastore.

11. A non-transitory processor-readable storage medium having stored therein program code of one or more software programs, wherein the program code when executed by at least one processing device causes the at least one processing device:
to configure configuring two or more of a plurality of hardware components to perform respective data collection processes, wherein: the hardware components are associated with at least a first location, the configuring is performed by a system layer of an operating system installed on at least one of the plurality of hardware components, and a given one of the data collection processes collects usage data of the corresponding hardware component based on one or more characteristics of the corresponding hardware component;

to obtain, by the operating system from the configured hardware components, the usage data collected by each of the data collection processes over a given time period; and to upload the obtained usage data to a datastore that is associated with at least a second location.

12. The non-transitory processor-readable storage medium of claim 11, wherein the given data collection process is defined at the system layer of the operating system based on a type of the corresponding hardware component.

13. The non-transitory processor-readable storage medium of claim 11, wherein the given data collection process: (i) is defined by a plugin installed at an application layer of the operating system and (ii) communicates with the system layer of the operating system via one or more application programming interfaces.

14. The non-transitory processor-readable storage medium of claim 11, wherein the operating system monitors information corresponding to a given one of the configured hardware components, wherein the information comprises one or more of: transactions, errors, and exceptions associated with the data collection process of the given hardware component.

15. The non-transitory processor-readable storage medium of claim 14, wherein the program code further causes the at least one processing device:

to provide, by the operating system, a dashboard that visualizes at least a portion of the monitored information.

16. An apparatus comprising:
at least one processing device comprising a processor coupled to a memory;
the at least one processing device being configured:
to configure configuring two or more of a plurality of hardware components to perform respective data collection processes, wherein: the hardware components are associated with at least a first location, the configuring is performed by a system layer of an operating system installed on at least one of the plurality of hardware components, and a given one of the data collection processes collects usage data of the corresponding hardware component based on one or more characteristics of the corresponding hardware component;

to obtain, by the operating system from the configured hardware components, the usage data collected by each of the data collection processes over a given time period; and to upload the obtained usage data to a datastore that is associated with at least a second location.

17. The apparatus of claim 16, wherein the given data collection process is defined at the system layer of the operating system based on a type of the corresponding hardware component.

18. The apparatus of claim 16, wherein the given data collection process: (i) is defined by a plugin installed at an application layer of the operating system and (ii) communicates with the system layer of the operating system via one or more application programming interfaces.

19. The apparatus of claim 16, wherein the operating system monitors information corresponding to a given one of the configured hardware components, wherein the information comprises one or more of: transactions, errors, and exceptions associated with the data collection process of the given hardware component.

20. The apparatus of claim 19, wherein the at least one processing device is further configured:

provide, by the operating system, a dashboard that visualizes at least a portion of the monitored information.

\* \* \* \* \*